US010534114B2

(12) United States Patent
Voloschenko et al.

(10) Patent No.: US 10,534,114 B2
(45) Date of Patent: Jan. 14, 2020

(54) SUBSTRATE-GUIDED HOLOGRAPHIC DIFFUSER

(75) Inventors: Dmitry Voloschenko, Torrance, CA (US); Fedor Dimov, Redondo Bech, CA (US); Kevin Yu, Temple City, CA (US); Engin Arik, Moorpark, CA (US)

(73) Assignee: Luminit LLC., Torrance, CA (US)

( * ) Notice: Subject to any disclaimer, the term of this patent is extended or adjusted under 35 U.S.C. 154(b) by 808 days.

(21) Appl. No.: 13/339,923

(22) Filed: Dec. 29, 2011

(65) Prior Publication Data

US 2012/0188791 A1 Jul. 26, 2012

Related U.S. Application Data

(60) Provisional application No. 61/428,919, filed on Dec. 31, 2010.

(51) Int. Cl.
*G02B 5/32* (2006.01)
*G02B 5/02* (2006.01)
(Continued)

(52) U.S. Cl.
CPC ......... *G02B 5/0252* (2013.01); *G02B 6/0043* (2013.01); *G02B 6/0051* (2013.01); *G02B 6/0053* (2013.01); *G02B 6/0055* (2013.01); *G02F 1/133606* (2013.01); *G03H 1/0408* (2013.01); *G02F 2001/133607* (2013.01);
(Continued)

(58) Field of Classification Search
CPC .. G03H 1/0244; G03H 1/0248; G03H 1/0408; G03H 2223/16; G02B 6/0033; G02B 6/0036; G02B 6/0038; G02B 6/0051; G02B 6/26

USPC .......... 359/13, 15, 24, 28, 34; 385/146, 147; 362/625; 349/113
See application file for complete search history.

(56) References Cited

U.S. PATENT DOCUMENTS 3,708,217 A * 1/1973 McMahon ........... G02B 5/0252
359/15
5,418,631 A * 5/1995 Tedesco ......................... 359/15
(Continued)

FOREIGN PATENT DOCUMENTS

| JP | 07-020321 | 1/1995 |
|----|-----------|--------|
| JP | 2002-131551 | 5/2002 |
| WO | WO 2003/004931 | 1/2003 |

OTHER PUBLICATIONS

PCT International Search Report for related Application No. PCT/US2011/067798 dated May 31, 2012.
(Continued)

*Primary Examiner* — Audrey Y Chang
(74) *Attorney, Agent, or Firm* — Lathrop Gage L.L.P.

(57) ABSTRACT

A substrate-guided holographic diffuser has a light-guide section configured to in-couple light and transmit the light within itself via total internal reflection. It can also have a brightness enhancement section that recycles non-diffracted light within the light-guide section. A hologram section that receives light from the light-guide section has a holographic structure defining acceptance conditions and is positioned relative to the internally reflected light such that the internally reflected light meets the acceptance conditions of the holographic structure. The internally reflected light is out-coupled by the holographic structure as a projected image of light scattered from a diffuser.

7 Claims, 11 Drawing Sheets

(51) Int. Cl.
  *G03H 1/04*   (2006.01)
  *G02F 1/13357*  (2006.01)
  *F21V 8/00*   (2006.01)
  *G03H 1/02*   (2006.01)

(52) U.S. Cl.
  CPC ... *G03H 1/0248* (2013.01); *G03H 2001/0413* (2013.01); *G03H 2001/0415* (2013.01); *G03H 2001/0439* (2013.01); *G03H 2001/0473* (2013.01)

(56) References Cited

U.S. PATENT DOCUMENTS

| | | | | |
|---|---|---|---|---|
| 5,506,929 | A | * | 4/1996 | Tai ............... F21V 5/02 385/146 |
| 5,892,598 | A | * | 4/1999 | Asakawa et al. ........... 359/13 |
| RE38,305 | E | * | 11/2003 | Gunjima ........... F21V 9/14 349/113 |
| 7,845,841 | B2 | * | 12/2010 | Sampsell ........... G02B 6/0046 359/34 |
| 2002/0018158 | A1 | | 4/2002 | Putilin |
| 2004/0246743 | A1 | * | 12/2004 | Lee ............. G02B 6/0036 362/561 |
| 2006/0256415 | A1 | * | 11/2006 | Holmes et al. ........... 359/28 |
| 2006/0285185 | A1 | * | 12/2006 | Choi ............. G02B 6/0038 359/15 |
| 2007/0211342 | A1 | * | 9/2007 | Komatsu ........... G02B 5/1871 359/566 |
| 2010/0187422 | A1 | * | 7/2010 | Kothari ........... H05B 37/0227 250/353 |
| 2011/0058355 | A1 | * | 3/2011 | Teng ............. G02F 1/133308 362/97.2 |

OTHER PUBLICATIONS

Office Action from related Taiwan application 100149912, dated Aug. 10, 2015 (7pgs.).
Search Report from related Taiwan application 100149912, dated Aug. 10, 2015 (1 pgs).
English translation of Office Action from related Taiwan application 100149912, dated Aug. 10, 2015 (9 pgs.).
English translation of Search Report from related Taiwan application 100149912, dated Aug. 10, 2015 (2 pgs).
Machine translation of Description for JP2002131551 (18 pgs.).
Machine translation of Claims for JP2002131551 (4 pgs.).

* cited by examiner

SUBSTRATE-GUIDED HOLOGRAPHIC DIFFUSER

CROSS-REFERENCE TO RELATED APPLICATIONS

This application claims the benefit of U.S. Provisional Application No. 61/428,919 entitled "Substrate Guided Holographic Diffuser," and filed on Dec. 31, 2010.

BACKGROUND OF THE INVENTION

Liquid crystal displays (LCDs) have become an important part of information display in today's information society. As the demand grows, there is a substantial need to reduce the power consumption of backlit LCDs, while making them more affordable to consumers. A current trend is to design and manufacture thinner, less costly, and more power efficient LCDs. A major power-consuming part of an LCD is its backlight module. According to Kobayashi et al., backlight units for backlit LCDs account for up to 80% of the electric power consumption and 40% of the material costs of the LCDs [Ref. 1]. Current LCD backlights are inefficient; five or even six diffusers and other optical elements may be needed to build an LCD backlight for notebooks, computer screens and for other applications.

Most LCD devices need backlight units. According to Kobayashi et al, it is desirable that advanced backlight units substantially reduce their electric power consumption. Cost reduction would also encourage the early adoption of improved LCD technology.

FIGS. 1 & 2 show two established ways to arrange light sources 102 (e.g., LEDs) for LCD backlighting. In the edge backlighting (FIG. 1), the LED light is diffused into the light guide 104 and the light is reflected from either the top or bottom surface structure of the light guide to the surface. In the direct-view backlighting (FIG. 2), light sources 102 with diffuser(s) 106 on top of them are placed directly behind the display. The direct-backlighting approach (FIG. 2) usually requires more electric power as more LEDs are usually needed to achieve the same display brightness uniformity [Ref. 2].

Referring to FIG. 3, current LCD backlights usually consist of 6-7 components: a reflector 302, light sources (exemplarily LEDs) 304, a light guide 306, two or three diffusers 308, one or two brightness enhancement films (BEFs) 310. The LCD 312 uses polarizers 314 to control the passage of light into and out of the LCD. A conventional backlighting solution works in the following way: light from an LED 304 is coupled into the dot-printed 316 light-guide plate (either flat or wedged). The wedged shape is often preferred as it tends to increase the light throughput efficiency by reducing end-face light loss [Ref. 3]. The light rays are scattered randomly when, they encounter a printed dot. Brightness enhancing films 310, seen as crossed microprismatic sheets, are used to manage the angle of light upwards thus enhancing brightness in the direction normal to the viewing plane, as in Refs. 4 & 5, and diffusers 308 are used to smooth out the spotted appearance caused by the dotted plate and by the prismatic structures. Thus, in a conventional approach, six to seven films and other components are needed to homogenize and evenly distribute light upwards from LEDs.

Films with linear structure interfere with the pixel structure of the LCD. The superposition of two spatial frequencies forms a series of observable fringes. This undesired moiré pattern substantially deteriorates the visual appearance of the display. To reduce moiré effects, at least one top diffuser must be placed between the LCD and micro-prismatic BEF film. The top diffuser(s) can be configured to decouple the interference of LCD and micro-prismatic films. But these top diffusers introduce an undesirable additional light loss (and, therefore, power efficiency loss) due to reflection and scattering. In general, each additional component introduces some extra light loss (2-4%) at each surface-air interface.

A single-component backlight unit is needed to reduce both the light losses on interfaces between the backlight components and the cost of the backlight unit (the number of components used). An early solution for such a system, i.e., for a substrate-guided diffuser-LCD backlight was proposed by Kaiser Optical Systems [Ref. 6]. Unfortunately, this solution cannot be reduced to practice as was experimentally shown in Ref. 7 because the laser light introduced into the light guide at some divergent (or convergent) cone angle will generate speckle, and presence of this speckle field is an obstacle in providing homogeneous speckle-free illumination for an LCD.

An unsuccessful multi-grating approach suggested by Samsung [Ref. 8] lacked a provision to control the diffusers' angular distribution. Another research attempt to provide an LCD backlight with a reduced number of components was made by Kuraray Co. [Ref. 9]. But the authors acknowledged that the brightness (luminance) of the backlight was not sufficiently increased; also, an additional element was needed to compensate for a too thin light-guiding plate.

Hitachi Chemical Co. Ltd. proposed a backlight device with improved efficiency using a surface relief hologram [Ref. 10]. However, a developed backlight device requires an additional light-guide plate with V-shaped groves, thus reducing the over-all light throughput efficiency. An LCD backlight with a single reflective holographic grating deposited on the lower side of the light guide wedge to replace a conventional reflector was described in Ref. 11. However, the low light throughput efficiency, substantial color dispersion of the single grating, and brightness non-uniformity of the developed backlight over the entire visible spectrum range proved to be serious issues that limit the effective use of such a system for LCD backlighting.

Achieving efficient light coupling from the backlight to the LCD can be brought about by using, e.g., linearly polarized light-emitting guide [Ref. 12]. While rather highpolarized contrasts can be achieved for out-coupled light, it is rather hard to efficiently recycle the trapped light with the orthogonal polarization.

Various approaches, e.g., using diffractive structures imprinted on transparent light-guide plates were tried [Ref. 3, Ref. 13]; however, it has not been possible to provide uniform illumination across the light-guide surface, and presence of undesired bright lines formed by diffracting images of the LEDs were quite visible. A cascade of a thick grating and a thin diffuser was shown to scatter radiation efficiently and uniformly over a wide angle [Ref. 14]; however such a system still requires two separate elements for the LCD backlight.

On the other hand, substrate-guided holography for visual applications is an established technology [Ref. 15, Ref. 16, Ref. 17, Ref. 18]. Approaches developed for visual applications can be successfully applied for non-imaging applications, such as, e.g. LCD backlighting and LED lighting. Combining substrate-guided holography with methods of fabricating light-control diffusers (e.g., holographic diffusers) is needed. Holographic diffusers are known, www.luminitco.com, to give a high light output gain in a given direction provided that either collimated or divergent light input is made at either normal or close to normal angle with respect to the diffuser surface. The need to have incident light at an angle close to normal with respect to the diffuser surface has prevented widespread use of holographic diffusers in the LCD backlighting industry thus far, because one or two additional optical films (e.g., DBEF films manufactured by 3M) are needed to collimate the light from LEDs (or other types of light sources) towards the holographic diffuser.

A conventional way to extract light from a light-guiding plate for an LCD backlight is to provide a dot-pattern on one side of the light-guide plate. The dots in the pattern can be distributed either homogeneously or non-homogeneously, according to an optimization design procedure based, e.g., on a molecular dynamics computational algorithm [Ref. 19]. Such design procedures are extremely computationally intense. In most cases, computational optimization is never complete because of the prohibitively long computational time needed. After a few initial optimization runs, a trial backlight mold is made, its light-extracting parameters are experimentally measured, then, based on experimental results, a few more optimization runs are made, and another trial mold is made, etc., until a satisfactory light-extracting performance is achieved. This conventional approach is very expensive, especially when a non-homogeneously distributed spatial dot pattern is required. Replacing it with a holographic design approach provides a way to substantially reduce the cost of the LCD backlight design.

In addition to LCD backlighting, an efficient substrate-guided diffuser is strongly needed for LED lighting. Municipalities and commercial enterprises look to LED-based lighting as a way to make major reductions in energy usage [Ref. 20]. The term 'LED lighting technology' currently implies design, manufacture, and/or integration of illumination/lighting elements for architectural, street, advertisement, signage, and other lighting based on LED light sources. An existing LED lighting technology consists of one or more LEDs, and LED electronic driver, and light-shaping elements (diffusers, plastic or glass lenses, plastic or glass sheets, light reflectors and/or concentrators, or any combination of these elements) [Ref. 20, Ref. 21]. Thus, a thin, substrate-guided light-shaping diffuser is needed for LED lighting technology.

SUMMARY OF THE INVENTION

An optically fabricated substrate-guided holographic diffuser to be coupled to an LED light source can include a light-guide layer, a transparent layer and reflecting layers. The transparent light-guide layer, either rigid or flexible, either flat or wedged is capable of accepting light from one or more LEDs into its edge and transmitting it through the total internal reflection along its length. The holographically-formed thin transparent layer can be placed either onto the light-guide plate or formed as part of it, in the latter case either parallel to the surface of the light-guide plate, or inclined at some angle with respect to it. The reflecting or retro-reflecting layers are deposited onto one or more surfaces of the light-guide plate so as to recycle non-diffracted light to provide improved light throughput.

The holographically-formed thin transparent layer can out-couple the LED light out of the light-guide plate in a specified direction so as to provide either backlighting for an LCD or a standalone LED-lighting. The specified light out-coupling direction can be either normal with respect to the said light-guide plate or it can be at some angle with respect to the light-guide plate. The above-mentioned holographically-formed thin transparent layer can be holographically recorded to be either reflective or transmissive. The holographically-formed thin transparent layer can have a property of variable diffraction efficiency across its surface so as to allow the proper amount of light to escape in order to provide the desired illumination profile (e.g., a uniform brightness for LCD backlight applications). The transparent layer can be of a volume Bragg hologram type, holographically-recorded using a collimated light wave front and a diffused light wave front, and providing diffraction of light into one diffraction order. Further, either single or multiple LED modules providing essentially collimated light coupled into the light-guide plate. The transparent layer can be of a thin hologram type, holographically recorded using essentially collimated light wave front and diffused light wave front. The transparent layer can be capable of providing both brightness enhancement in a given direction and control of the angular distribution of light out-coupled of the light-guide plate. Also, the transparent layer can be holographically-recorded using multiple wavelengths of laser light thus providing multi-color backlighting for LCD and for LED-lighting. Yet further, the transparent layer can be holographically-recorded to replace either a homogeneous or a non-homogeneous imprinted dot-pattern on the surface of the said light-guide through generation of the identical light distribution towards the LCD provided by the said pattern.

The substrate-guided holographic diffuser can also have a plurality of light sources (e.g., LED, CCFL, laser) coupled to the substrate-guided holographic diffuser that provide either white light or field-sequential illumination. These can be also plurality of either single-color or multiple-color laser sources coupled to the substrate-guided holographic diffuser through either free-form optics or a fiber optic means.

The benefits and advantages of the invention will be apparent to those skilled in the art from the discussion that follows.

DETAILED DESCRIPTION OF THE PREFERRED EMBODIMENTS

Figure 1:
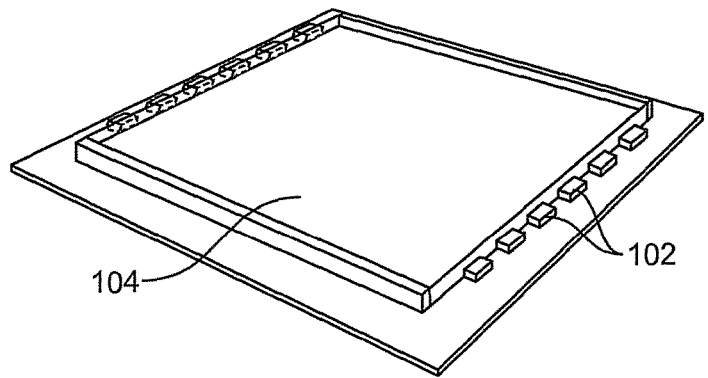
FIG. 1 shows the edge lighting approach to backlighting [Ref. 2].
Figure 2:
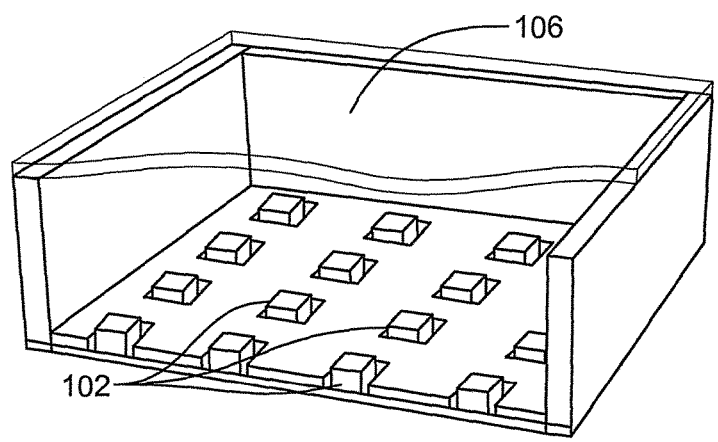
FIG. 2 shows the direct view approach to backlighting: [Ref. 2].

Although the present invention is susceptible to embodiment in various forms, there are shown in the drawings and will hereinafter be described preferred embodiments with the understanding that the present disclosure is to be considered as an exemplification of the invention and is not intended to limit the invention to specific embodiments illustrated.

It is to be further understood that the title of this section of the specification, namely, "Detailed Description of the Preferred Embodiments" relates to a rule of the United States Patent and Trademark Office, and is not intended to, does not imply, nor should be inferred to, limit the subject matter disclosed herein or the scope of the invention.

What follows is a successful design for a substrate-guided holographic diffuser, with the optical parameters comparable to LCD backlight based on common optics, with performance in terms of light-throughput efficiency, brightness (luminance), number of components used, weight, and cost that exceeds present LCD backlights that are based on optics common in the art.

Figure 4:
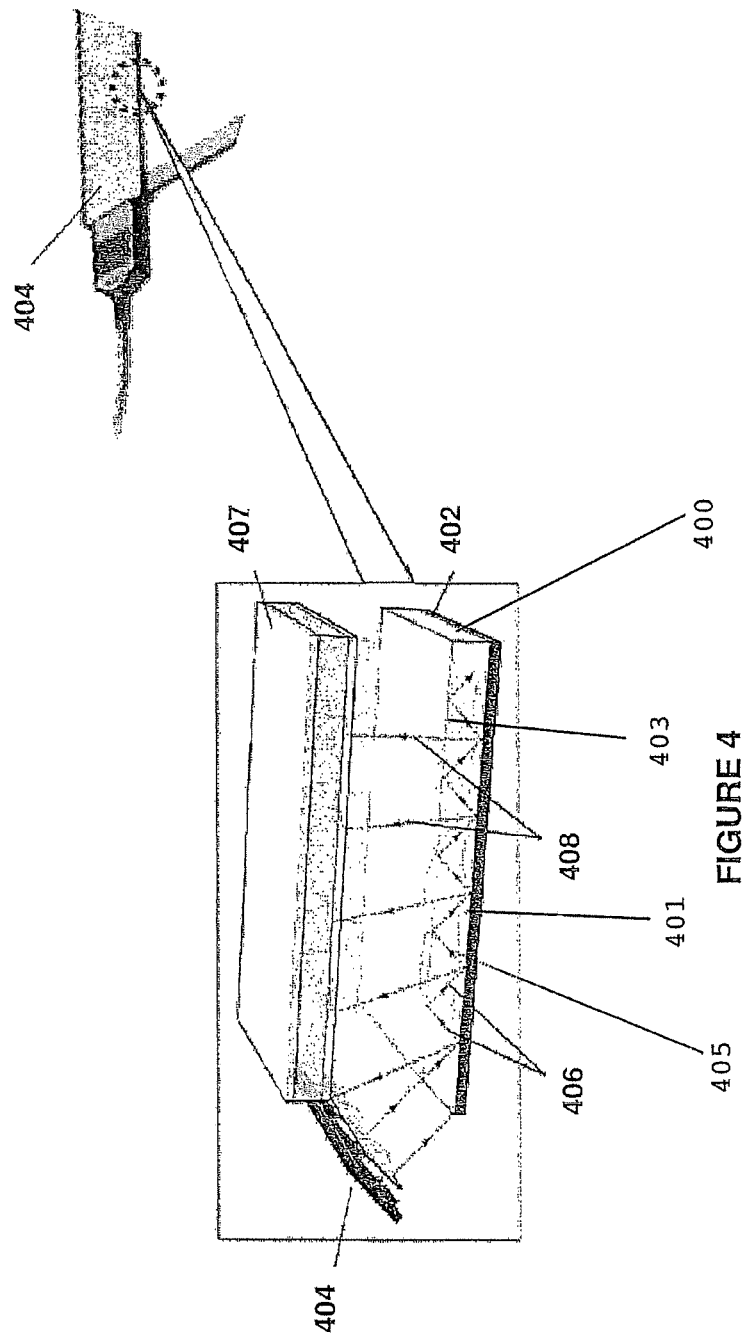
FIG. 4 shows a general structure of the Substrate-Guided Holographic Diffuser as efficient backlighting solution for LCDs and LED lighting applications.
Figure 6:
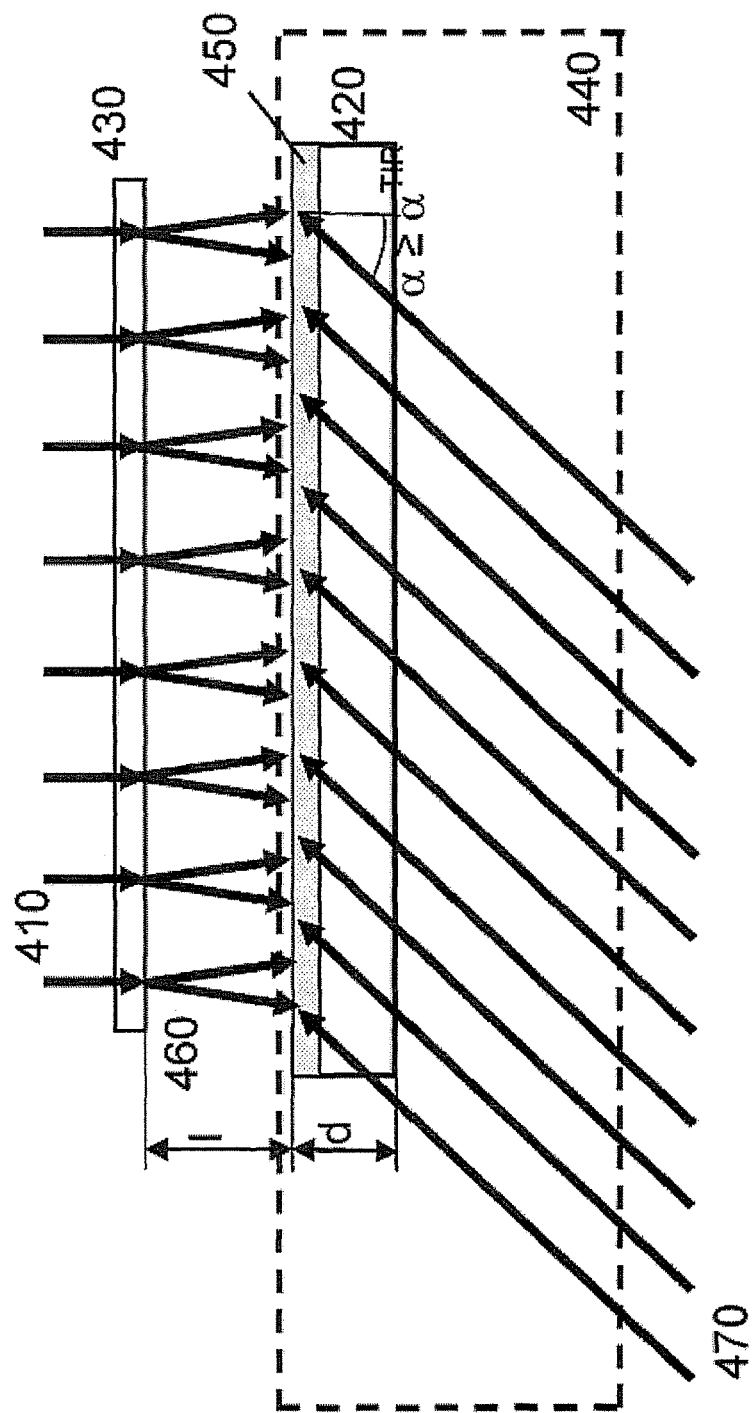
FIG. 6 is a cross-sectional view of the optical fabrication (holographic recording) of the substrate-guided holographic diffuser with laser light in the case when the substrate-guided holographic diffuser is recorded as a reflective holographic element.

Referring to FIG. 4, one embodiment of a Substrate-Guided Holographic Diffuser as an efficient backlighting solution for. LCDs and LED-Lighting Applications, based on advanced holographic techniques, can have a single-component optical element 402 paired with an LED module 404. The single-component optical element can comprise a light-guide plate, a brightness enhancement film, and a light-homogenizing diffuser with a controlled angular diffusion angle. The transparent light guide can have a holographic diffusion element laminated (or, deposited in any other known way in the art) on it. The holographic element can be of volumetric (thick) type. Collimated light from the LED module(s) enters the transparent light guide and the in-coupled light 406 bounces inside the light-guide due to total internal reflection. On each bounce where the in-coupled light contacts the hologram, the hologram diffracts out-coupled, light 408 out of the plate with a pre-determined diffusion cone angle, towards the LCD 407. The hologram can be designed to illuminate the LCD uniformly. The increased brightness is based on the brightness gain property of the holographic diffuser. The substrate-guided holographic diffuser can be an optical element comprising a light-guide plate, a brightness enhancement film, and a light-homogenizing diffuser all in one structure. This eliminates the need for three-five additional optical films, and provides a thin integrated one-component LCD backlight that gives light output gain. Both the power consumption of the backlight and the cost reduction are addressed. Copying can be used for mass replication by means of a roll-to-roll web process (FIG. 6). A master hologram is applied to the surface to bear the new hologram and is illuminated by an object beam (460) which is recovered from the master hologram via the application of a reference beam (470) which mimics the original reference beam used to create the master hologram. The result is that the new hologram is an exact copy of the master hologram.

Another embodiment of this disclosure can have a divergent light from LED module(s) coupled into the transparent substrate-guided holographic diffuser. To cover a substantial area of the light-guide is easy with a divergent, rather than collimated light from an LED (or with any other light source used in the art).

Yet another embodiment of this disclosure is to use multi-color (e.g., white LEDs or other types of light sources) efficiently coupled to substrate-guided holographic diffuser element thus providing multi-color (e.g., white) illumination either for LCD or for architectural (or other type) of lighting. Substrate-guided holographic diffuser is made to accept multi-color wavelength bands (e.g., Red, Green, and Blue) by applying a substrate-guided color holographic recording.

In another embodiment of this disclosure, holographic element is of a surface-relief (thin) type, thus providing an efficient method for mass replication of substrate-guided holographic diffuser elements for LCD backlighting and for LED (or other type of light source) illumination.

In another embodiment of this disclosure, the geometry of the substrate-guided holographic diffuser can be of a wedge shape. Such a shape can increase the system efficiency through reduction of the opposite side light loss through light recycling.

In another embodiment of this disclosure, either reflecting or retro-reflecting surfaces can be applied for a flat-shaped (or wedge-shaped) substrate-guided holographic diffuser to increase the system efficiency by reducing the opposite side light-loss through light recycling. Similarly, all of the surfaces of the substrate-guided holographic diffuser, except for the side where light injecting light sources (e.g. LEDs) are positioned, have either reflecting or retro-reflecting surfaces deposited on them.

In yet another embodiment of this disclosure, a bendable material is used for substrate-guided holographic diffuser so that a substrate-guided holographic diffuser-based backlight can be used for flexible LCD displays.

The embodiments of this disclosure also contemplate replacement of either homogeneously or non-homogeneously spatially distributed dot patterns on one side of the LCD backlight with a holographically generated surface (or volume) structure.

An optically-fabricated diffuser with substrate-guided light input is produced through holographic recording using coherent collimated and diffused laser wave fronts. The diffuser can be made either for monochrome illumination or for multi-color (e.g., white light) illumination. In the latter case, color holographic recording is implemented. The diffuser is designed to accept the light from either one light source or from a plurality of light sources placed at its edge. The diffuser can be made either from a rigid or flexible optically transparent material. The brightness enhancement property is provided in a desired direction through control of the diffusion cone angle of the diffused laser wave front during holographic recording.

Figure 3:
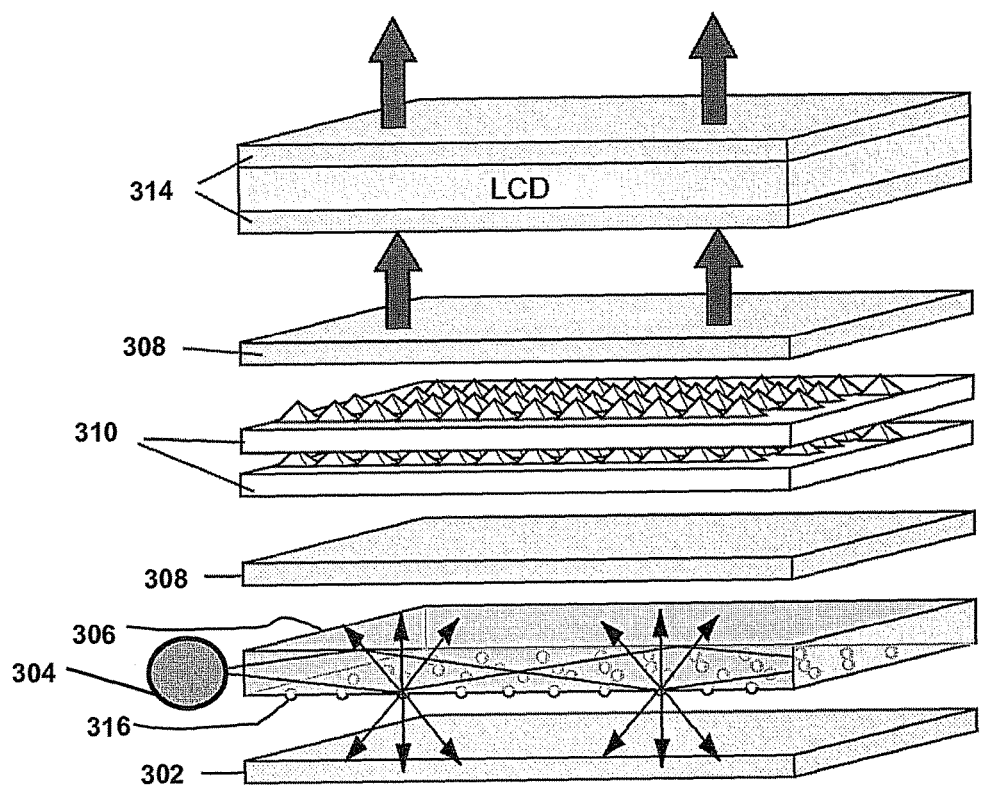
FIG. 3 is a schematic of a conventional LCD backlighting system.
Figure 5:
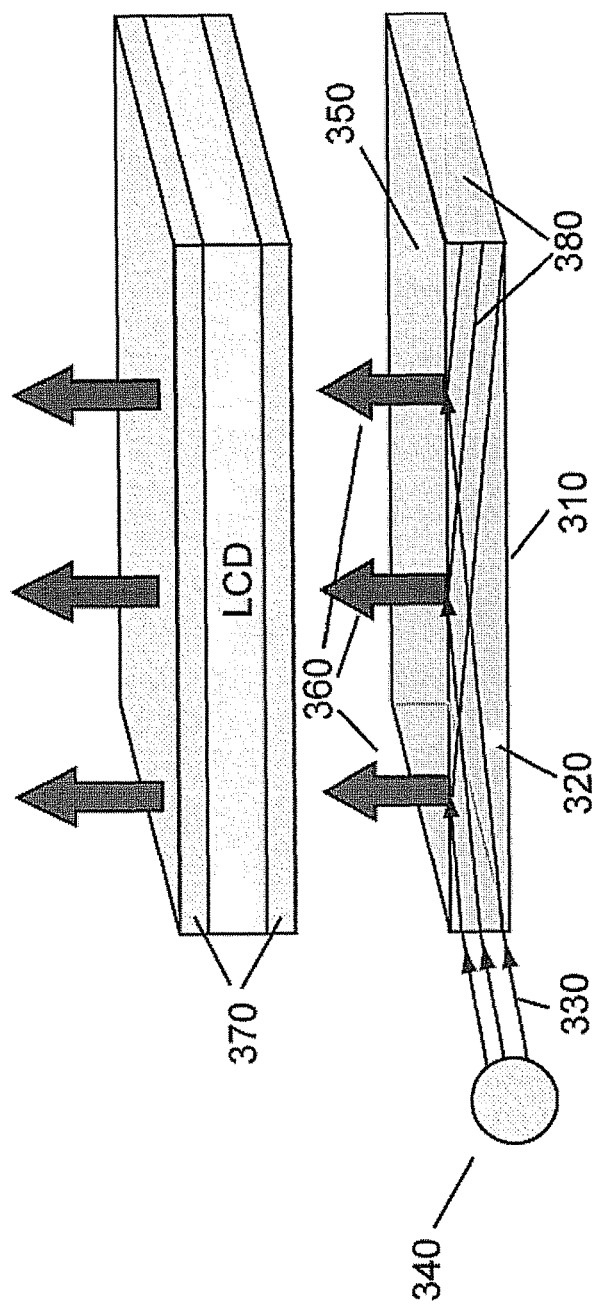
FIG. 5 shows the structure of the Substrate-Guided Holographic Diffuser along with the LCD.

Referring to FIG. 5 a Substrate-Guided Holographic Diffuser can have a transparent light-guide plate 320, either flat or wedged, which accepts the light 330 from one or more LEDs 340 positioned at one side of the plate 320, transfers this light by a way of the total internal reflection (TIR) along its side. A brightness enhancement film 310 is attached to the plate 320. At certain points along the direction of propagation of the in-coupled light, specifically at the points where in-coupled light intersects with the hologram 350 of the plate 320, the in-coupled light is out-coupled in a pre-designed way (upwards on FIG. 3) towards the LCD, thus providing illumination light 360 for the LCD. The LCD can have polarizers 370 attached to it. 'Holographically-formed surface' here and hereafter designates a layer of the holographically-formed diffractive optical element that constitutes an essential part of the substrate-guided holographic diffuser system. The holographically-formed surface can be thin (e.g., .about.20 micron). 'LED' (or 'LEDs', or 'LED light sources', or 'light sources', or 'LED modules') here and hereafter designates LED module (or, LED modules) consisting of LED chips coupled to either free-form surface optics or fiber optic means, or any other means known in the art that provide collimated light for substrate-guided, holographic diffuser. At the same time, it should be understood that the light coming out from these LED modules can be either divergent or convergent according to the embodiments of the present disclosure. 'LED', 'LEDs', 'LED modules', 'LED light sources' are used here and hereafter interchangeably. Other light sources may be used with the invention as well, but it is expected that the majority of uses will be with LED lighting.

It is further understood that either reflecting or retro-reflecting surfaces 380 may be formed on one or more sides of the light-guide plate 320 so that to increase the light throughput efficiency of the substrate-guided holographic diffuser backlight through re-cycling of non-diffracted light inside the plate 320.

LEDs 340 can be placed on one or more sides of the plate 320. Hologram 350 can be positioned either on the face of the plate 320 that faces the LCD, or on the opposite face from the LCD. The hologram 350 can also be placed or formed inside of the plate 320. The hologram 350 can also be placed either parallel or at some angle with respect to the horizontal direction on FIG. 5.

Light sources 340 can be also compact lasers (e.g., diode lasers) with corresponding light output conditioning optics, either single color (e.g., green) or multi-color (e.g., red, green, and blue).

The plate 320 can be substantially transparent in at least a portion thereof, but may be also entirely transparent. The plate 320 can be made from a number of materials. For example, the plate 320 can be made of at least glass, polycarbonate plastic, acrylic plastic, polyolefin resin, or any other plastic used in the art. Such a plate 320 is at least operative when having a thickness of the 0.3-6 mm, but can also be operative at other thicknesses.

The plate 320 is depicted in the figures as a single, unitary body of a single material. However, the plate 320 may also comprise a plurality of bodies made of a single or a plurality of materials. A person of ordinary skill in the art will be capable of using ray-tracing software to determine whether the particular configuration of materials and bodies will serve to transmit the light 330 in-coupled from the LED 340 through the plate 320, and out-coupled at the hologram 350 towards the LCD.

The in-coupled light 330 is transmitted through the plate 320 through TIR. The substrate 320 must have an index of refraction, relative to the environmental medium, sufficient to internally reflect the light. For example, in space, the index of refraction is very close to 1; in air the index of refraction is about 1.00025 to 1.00030. Those of ordinary skill in the art will be able to calculate an angle of total internal reflection. E.g., R. Guenther, "Modern Optics", p. 78 (Ed. 1990). Examples of high-index of refraction materials capable of total internal reflection with many media are polycarbonate plastic, acrylic plastic.

Transparent means that the plate 320 is capable of permitting light through to allow the light out-coupling at the surface hologram 350 towards the LCD. Accordingly, the plate 320 may be color tinted or have other modifications that do not render the device inoperative. For example, any material will have some amount of diffusion from imperfections or inclusions, but the diffusion should not be so great as to prevent the acceptance, conveyance, and transmission of the light by the plate 320.

The plate 320 can be made of a bendable (flexible) material thus capable of providing backlight for a flexible type LCD. Flexible LCDs are known to those skilled in the art as capable of changing their shape upon application of the mechanical bend, twist, or splay force, without any degradation in the image quality or mechanical wholeness of the device.

The LEDs 340 can be either just bare chip LEDs or packaged LEDs that include coupling optics that facilitate efficient light coupling between the LED chip and the light-guide plate 320. LEDs can be of a white color type. Also, LEDs can be of red (R), green (G), and blue (B) color type, all packaged together so as to provide either simultaneous illumination such as it is visible to an observer as a white light, or field-sequential illumination visible to the observer also as a white light. Also, LEDs can be of a single color to provide backlight for monochrome LCDs. LED electronic drivers known to those skilled in the art are used to drive the LEDs.

In one embodiment, substrate-guided holographic diffuser 350 is formed as a 'thick' Bragg-type volumetric holographic optical element. This means that it diffracts the light into a single diffraction order. Hence, its diffraction efficiency can be very high (theoretically up to 100%). This results in a very high light throughput of the optical system (theoretically up to 100%), experimentally up to 80% can be achieved. The material for volumetric holographic recording of such an optical element can be, e.g., DuPont HRF700X318 photopolymer, either laminated or spin-coated onto the plate 320.

The substrate-guided holographic diffuser 350 can be integrally formed as an optically fabricated light-guiding element and a diffuser with a controlled diffusion cone angle in one, thus allowing to those skilled in the art to use substrate-guided holographic diffuser as an efficient single-component backlight for LCDs, and as an LED lighting component for architectural, office, street, etc. lighting.

One step in fabricating a Substrate-Guided Holographic Diffuser is to define the geometry of the holographic recording. The worker of ordinary skill in the art will need to take into account the consequences of some choices that he or she may make.

Referring further to FIG. 6, in recording, a transparent plate 420 with a photo-material 450 deposited on top of it is either placed into the refractive index-matching liquid 440 supplied, e.g., by Cargille Labs [Ref. 23], or put on an index-matching prism with a thin layer of index-matching liquid in between. The index can be matched very precisely to that of a particular substrate material. Thus, the incident wave front (a plane, divergent, or convergent wave) can be directed at an angle equal to or larger than the value of the TIR angle with respect to the photo-material; e.g., for air-acrylic interface, $\alpha^{TIR}=\sin^{-1}(1/1.49)=42.2°$.

Wave front 460 is a diffused light generated by a diffuser (e.g., ground glass) 430 when collimated laser light 410 is incident upon it. Lambertian diffusers are discussed in more detail below. The distance l between the Lambertian diffuser 430 and the surface of the photo-material 450 controls the recorded (and later reconstructed) diffusion cone angle. It is desirable to have the thickness d of the plate 420 as thin as possible, so that a very thin LCD backlight can be made. Thicknesses as small as 0.3 mm are possible. Packaging requirements for the illuminating LED module may constrain how thin the thickness of the plate 420 can be.

Figure 7:
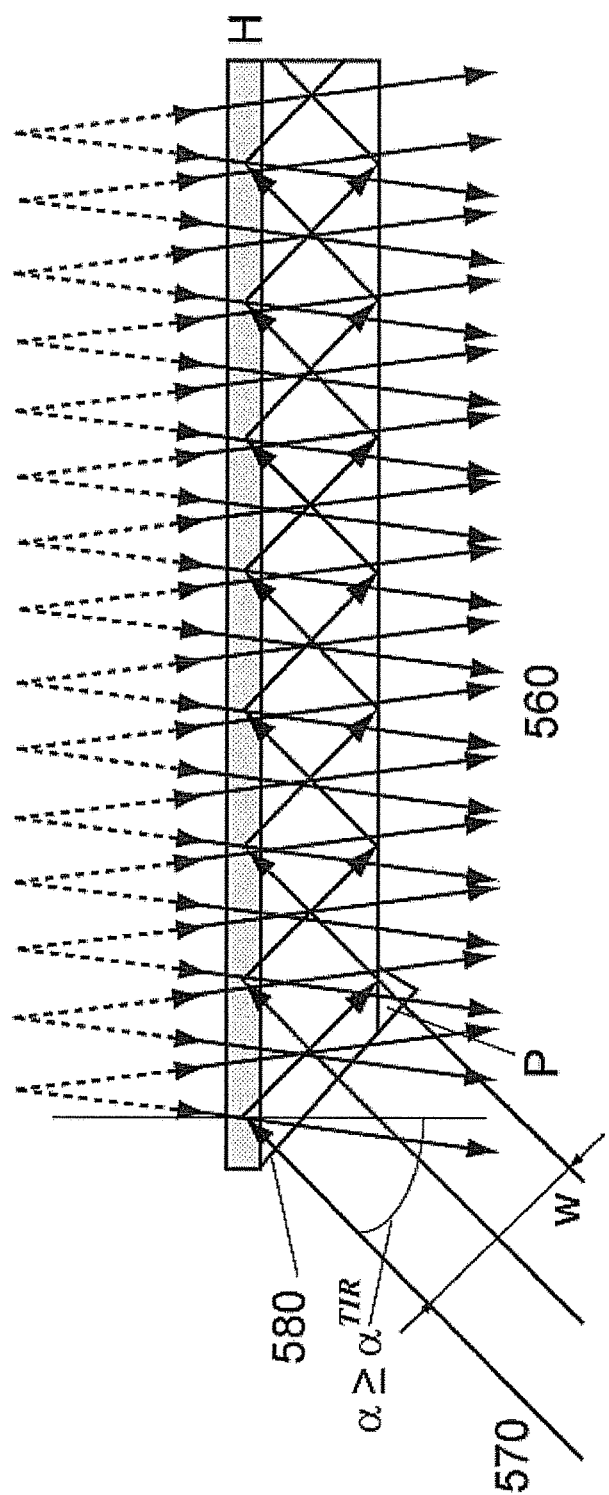
FIG. 7 is a cross-sectional view illustrating the principle of the substrate-guided holographic diffuser operation in the case when substrate-guided holographic diffuser is of the reflective holographic type.

Laser wave fronts 470 and 460 interfere in the photo-material 450 (thickness, e.g., ~20 µm), thus creating an interference pattern which, on post-processing of the photo-material, becomes a hologram (H, FIG. 7). The hologram, when illuminated with one of the recording wave fronts, is known to re-construct a wave front identical to the one that was used in recording [Ref. 24]. For example, if we illuminate the hologram H with the same wave front that was used in its recording (570 on FIG. 7), then the wave front 560 (identical to 460, FIG. 6) will be reconstructed (FIG. 7). An LCD is intended to be placed below the bottom of the waveguide on FIG. 7. As we will inject the light from an LED module into the waveguide, the collimated beam 570 is rather narrow, permitting its multiple reflections inside the waveguide. An angled cut on the left-hand side of the light guide 580 is needed for optimal light coupling for the wave front 570. Light beam 570 goes through multiple reflections inside the light guide. The minimum width of the light beam 570, w, which is needed to provide a continuous incident wave 570 coverage of the bottom surface of the hologram H without spatial interruptions, is given by: w=2d sin α.

In another embodiment of this disclosure wave front 460 is a diffused light generated by a light-control diffuser (e.g., Luminit LSD-type diffuser, or Engineered Diffuser made by RPC Photonics, Inc.) 430 with an appropriate diffusion cone angle when collimated laser light 410 is incident upon it (FIG. 6). Light-control diffusers are discussed in more detail below. The distance l between the light-control diffuser 430 and the surface of the photo-material 450 controls the recorded (and later reconstructed) diffusion cone angle. It is desirable to have the thickness d of the plate 420 as thin as possible, so that a very thin LCD backlight can be made. Thicknesses as small as 0.3 mm are possible. Packaging requirements for the illuminating LED module may constrain how thin the thickness of the plate 420 can be.

It is further understood for those skilled in the art that adjusting of the diffraction efficiency across the light guide is desirable. A collimated light beam 570 on each bounce in the light guide (FIG. 7) will reconstruct the wave front 560; however, at each bounce the intensity of the light beam 570 will be depleted. This will result in inhomogeneous brightness of the backlight along the substrate length. To negate this unwanted effect, a gradient for the diffraction efficiency along the substrate length can be provided. One way to do this is by adjusting the intensity ratio for the recording wave fronts 470 and 460 (FIG. 6) in such a way as, e.g., $I_{470}/I_{460}=1$ while varying the combined intensity of recording light $(I_{470}+I_{460})$ across the photo-material 450, where $I_{470}$, $I_{460}$ are intensities of the beams 470 and 460, the light-guide linear dimension is, e.g., ~50 mm; 50 mm should be understood as an example only, this limiting value can be any corresponding to real dimensions of various types of LCDs that require a backlight. Another way to provide homogeneous brightness of the substrate-guided holographic diffuser backlight is to make the diffraction efficiency of the central part of the holographic element H maximal while decreasing it smoothly to the edges of the plate 420, where the LED light sources 340 are placed. In this embodiment, a number of LED light sources (e.g., two) are placed spatially symmetrical with respect to the center of the plate 420. Other types of diffraction efficiency gradients can be envisioned that provide homogeneous brightness for substrate-guided holographic diffuser backlight.

Attention needs to be paid to the choice of the collimated vs. divergent wave front in laser recording and in subsequent LED illumination. Light beams 470 in FIGS. 6 and 570 in FIG. 7 are collimated as this defines a homogeneous wave front for hologram recording. The drawback of such geometry is that in actual illumination, the cross-section of the collimated light from the LED 340 needs to have a substantial value in the direction perpendicular to the plane of the drawing. This will require an array of LED modules 340 emitting collimated light, which might be objectionable from the power efficiency and packaging points-of-view. To cover a substantial area of the light-guide is easy with a divergent, rather than collimated light 570 from the LED 340. However, in this case, the recording must be done with an identical divergent laser wave front 470 as well. There is some trade-off between the value of divergence of the wave front 470 and the diffraction efficiency of the recorded hologram H.

It is further understood that holographic recording of the surface 450 depicted on FIG. 6 corresponds to recording a reflective holographic optical element (both recording wave fronts 460 and 470 are incident on the recording material from its opposite sides). FIG. 7, therefore, shows reconstruction of the reflective holographic optical element H.

Figure 8:
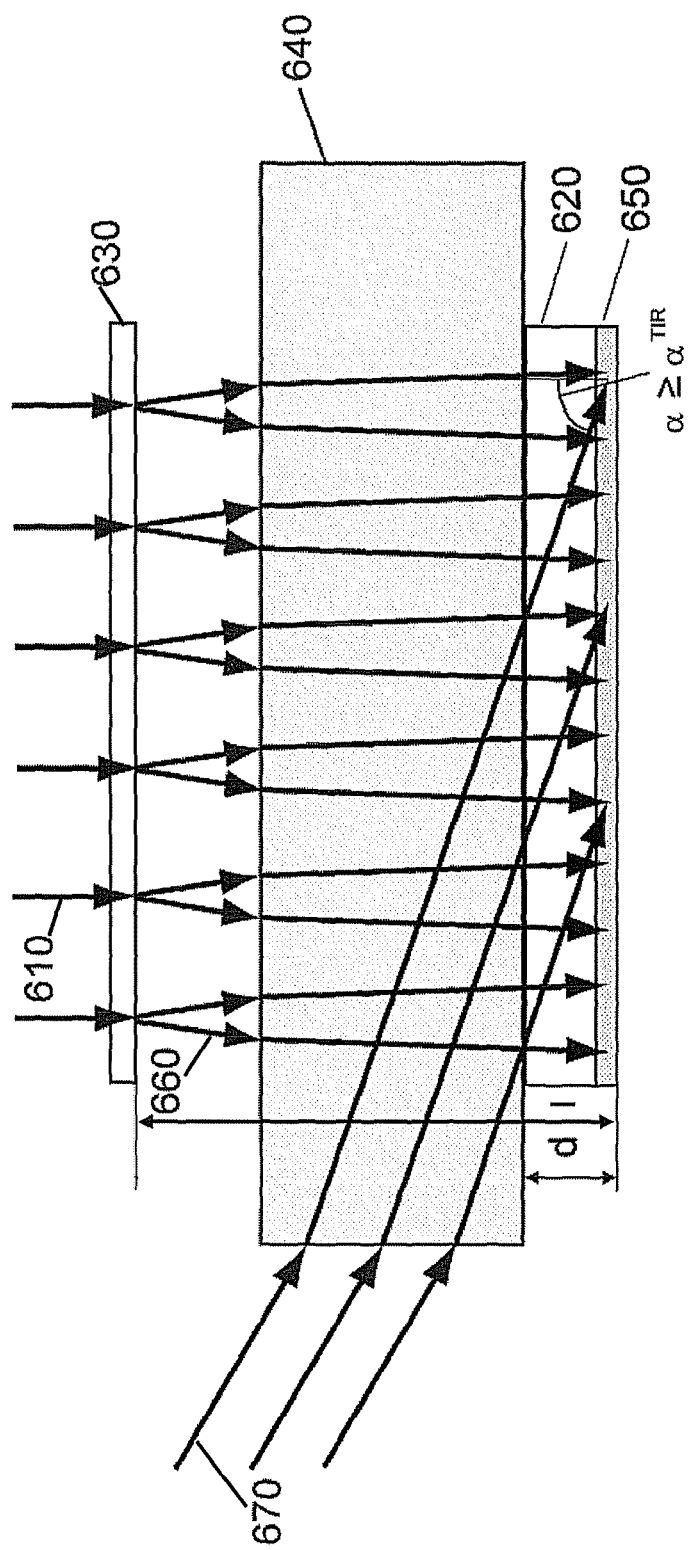
FIG. 8 is a cross-sectional view of the optical fabrication (holographic recording) of the substrate-guided holographic diffuser with laser light in the case when the substrate-guided holographic diffuser is recorded as a transmissive holographic element.

In another embodiment of this disclosure, recording of a transmissive-type holographic optical element is brought about through directing both recording wave fronts 660 and 670 onto the recording material from its one side, FIG. 8. A corresponding reconstruction of the wave front 660 is, therefore, also of a transmissive type. A transparent plate 620 with a photo-material 650 deposited on top of it is either placed into the refractive index-matching liquid 640 supplied, e.g., by Cargille Labs, Ref. 23, or put on an index-matching rectangular slab with a thin layer of index-matching liquid in between. The index can be matched very precisely to that of a particular substrate material. Thus, the incident wave front (a plane, divergent, or convergent wave) can be directed at an angle equal to or larger than the value of the TIR angle with respect to the photo-material; e.g., for air-acrylic interface, $\alpha^{TIR}=\sin^{-1}(1/1.49)=42.2°$.

Wave front 660 is a diffused light generated by a Lambertian diffuser (e.g., ground glass) 630 when collimated laser light 610 is incident upon it (FIG. 8). The distance l between the Lambertian diffuser 630 and the surface of the photo-material 650 controls the recorded (and later reconstructed) diffusion cone angle. It is desirable to have the thickness d of the plate 620 as thin as possible, so that a very thin LCD backlight can be made. Thicknesses as small as 0.3 mm are possible. Reconstruction of the wave front 660 is brought about by illuminating the plate 620 with the wave front 670 generated by light source 340 (FIG. 5).

In another embodiment of this disclosure wave front 660 is a diffused light generated by a light-control diffuser (e.g., Luminit LSD-type diffuser, or Engineered Diffuser made by RPC Photonics, Inc.) 630 with an appropriate diffusion cone angle when collimated laser light 610 is incident upon it (FIG. 8). Light-control diffusers are discussed in more detail below. The distance l between the light-control diffuser 630 and the surface of the photo-material 650 controls the recorded (and later reconstructed) diffusion cone angle. It is desirable to have the thickness d of the plate 620 as thin as possible, so that a very thin LCD backlight can be made.

Attention needs to be paid also to the emission cone angle of the backlight unit. A possibility to control this angle provides a great advantage and flexibility in design of efficient backlit LCDs. In addition, control of the emission cone angle is very important for LED-lighting applications. Emission cone angle of the holographic diffuser is related to the brightness enhancement factor (or, Gain factor G), as described below.

Brightness enhancement (or, Gain factor G) of a holographic diffuser is the ratio of the normal luminous intensity for the diffuser (a non-Lambertian source) to the gain factor for a Lambertian source. Luminous intensity for a Lambertian source is defined as $J=J_0 \cos \theta$, where J is a luminous intensity in Cd. Non-Lambertian sources are described as $J=J_0 \cos^n \theta$, n>1. It is possible to show that $$G = \frac{n+1}{2}. \qquad \text{[Ref. 25]}$$

The Half-Width-Half-Maximum (HWHM) angle can be determined from $\cos^n \theta_{1/2}=0.5=J/J_0$. Table 1 shows the relationship between various angular distributions and their corresponding values of Gain [Ref. 25].

TABLE 1

Luminous Intensity vs. Gain

| n | HWHM, $\theta_{1/2}$ | FWHM, $2\theta_{1/2}$ | G |
|---|---|---|---|
| 1 | 60 | 120 | 1 |
| 2 | 45 | 90 | 1.5 |
| 3 | 37.5 | 75 | 2 |
| 4 | 33 | 66 | 2.5 |
| 5 | 29.5 | 59 | 3 |
| 6 | 27 | 54 | 3.5 |

Figure 9:
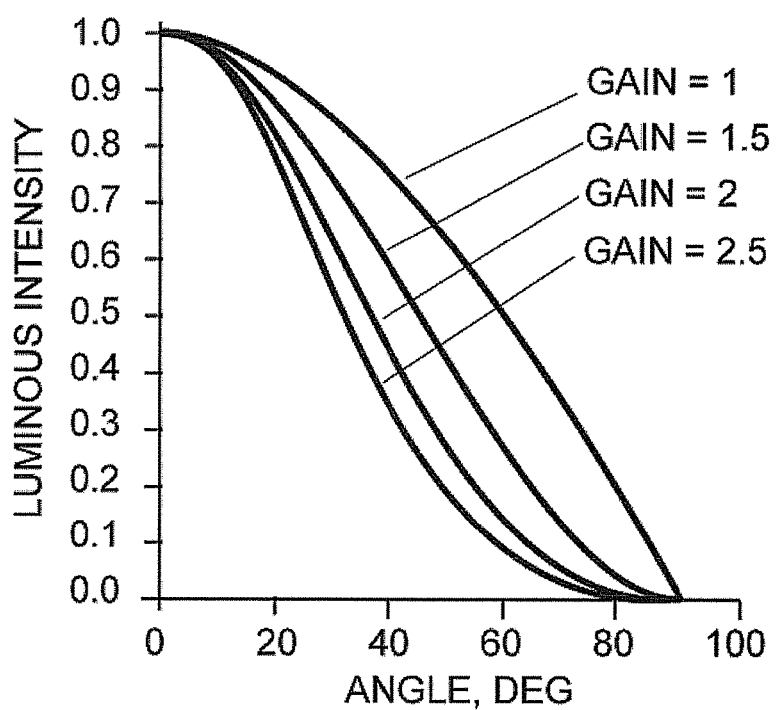
FIG. 9 is the plotted dependence of the luminous intensity vs. angle for various values of the diffuser gain from Table 1.

The light-control diffuser is based on the principle that the higher the Gain, the narrower the angular light distribution will be, FIG. 9. To achieve a high Gain, the outgoing light is squeezed into a narrower distribution. The property of achieving high Gains proved to provide substantial increase in brightness in the normal direction. The brightness uniformity of substrate-guided holographic diffuser is no worse than ~15% across the surface, which is sufficient for a good LCD backlight, according to [Ref. 1]. Thus, it should be understood for those skilled in the art that in addition to light-guiding and light-homogenizing properties, substrate-guided holographic diffuser provides brightness (luminance) enhancement. A desired diffusion cone angle for substrate-guided holographic diffuser can be chosen by adjusting l, the distance between the Lambertian diffuser 430 and the surface of the photosensitive material 450 (FIG. 6).

In the embodiments described above one color only (e.g., green) was used for holographic recording and subsequent reconstruction using the same color LED light. Thus, the substrate-guided holographic diffuser can be made for monochrome illumination (one color) as desired for monochrome LCDs. In this case, just one laser wavelength is used in recording shown on FIGS. 6, 8.

Figure 10:
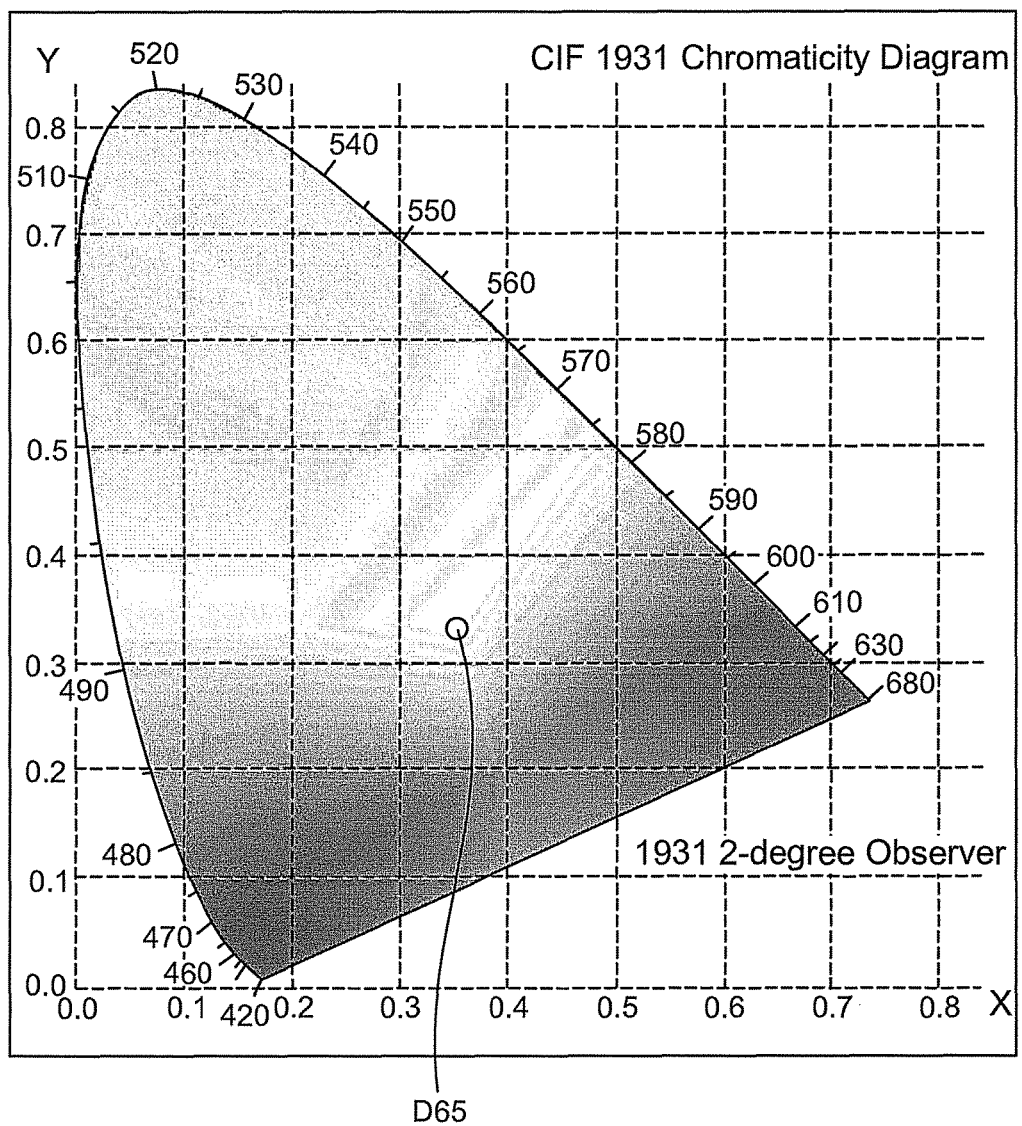
FIG. 10 is the CIE 1931 diagram for computations of recording R/G and B/G laser intensity ratios.

In another embodiment, the substrate-guided holographic diffuser can be made also for color illumination as desired for backlighting multi-color LCDs (e.g., two-color or full-color LCDs). The red (R), green (G), blue (B) color lasers that can be used for color recording might have, e.g., the following wavelengths: 647 nm, 532 nm, 457 nm. The R/G and B/G intensity ratios to get the right D65 White (x=0.31, y=0.33 of the 1931 CIE Chromaticity Diagram, (FIG. 10)) in recording are computed according to a standard procedure of computing color primary ratios detailed, e.g., in [Ref. 27].

Thus, white light holographic recording is brought about. The bandwidth of the recorded holographic structure has, at least, full width at half maximum (FWHM) ~20 nm for each of the RGB colors. The optimal color substrate-guided holographic diffuser solution is narrow-band emission LEDs (FWHM ~20 nm) of corresponding center emission wavelengths so that all of the emitted light is effectively coupled from the LEDs to the holographically-recorded diffuser 350.

In another embodiment, holographically-formed substrate-guided holographic diffuser replaces conventional homogeneous (or non-homogeneous) imprinted dot pattern (as shown in prior art FIG. 3) formed on the light-guide plate 320 for out-coupling light towards the LCD through generating the identical light distribution towards the LCD provided by the said pattern using holographic recording with, e.g., a collimated (or, divergent) wave front and a diffused wave front.

It should be further understood to those skilled in the art that brightness (luminance) of the substrate-guided holographic diffuser is controlled by the luminous output of the LED modules 340, which can provide either a constant value of their luminous output (and, consequently, the constant value for the substrate-guided holographic diffuser brightness), or a variable value of their luminous output (and, consequently, a variable value for the substrate-guided holographic diffuser brightness). The said constant or variable luminous output of the LED modules is controlled by LED electronic drivers in a way known to those skilled in the art. The brightness (luminance) uniformity of the substrate-guided holographic diffuser is defined as a maximum deviation from the average brightness over a plurality of points evenly distributed all over the surface of the substrate-guided holographic diffuser. Brightness (luminance) at each said point is measured experimentally using equipment known to those skilled in the art (e.g., using Konica-Minolta ChromaMeter CS-100) in the way known to those skilled in the art. The brightness uniformity is desirably no worse than ~15% across the substrate-guided holographic diffuser surface.

It should be further understood that substrate-guided holographic diffuser for LCD backlighting provides substantial advantages over the existing state-of-the-art as described below. E.g., a current Luminit product line, www.luminitco.com, or RPC Photonics product line, www.rpc-photonics.com/products.asp consist of diffusers that are all designed to be illuminated from some distance from the diffuser surface. A proposed substrate-guided holographic diffuser is designed to be illuminated from its edge. This property provides a more efficient LCD backlighting solution for LCDs and LED lighting patches for LED-lighting that are more compact than current solutions. Contrary to conventional diffusers, substrate-guided holographic diffuser can direct the diffused light, and even create a real image of the holographically-formed surface 350. Table 2 provides comparison of substrate-guided holographic diffuser to other light diffusers.

TABLE 2

Comparison of Light Diffusers: standard ground glass diffuser, Luminit standard diffuser, and the substrate-guided holographic diffuser

|  | Standard Ground Glass Diffuser | Luminit Off-the-Shelf Standard Light Shaping Diffuser | Substrate-guided Holographic Diffuser |
|---|---|---|---|
| Transmission | 20%-60% | 85%-92% | ~92% |
| Angle range, FWHM | ~10 deg, uncontrolled | 0.2 deg-80 deg, controlled | 0.2 deg-80 deg, controlled |
| Light source placement | Behind the diffuser, ~a few cm away | Behind the diffuser, ~a few cm away | At the edge of the diffuser |
| Application for LCD backlighting | Applicable as a part of the 6-7 component stack, lots of light loss | Applicable as a part of the 6-7 component stack, minimized light loss | Applicable as a single replacement for the 6-7 component stack, minimized light loss |

The value of the light transmission of the substrate-guided holographic diffuser listed in Table 2 (~92%) is the lowest taking into account Fresnel reflection light losses. It can be higher (up to ~96%) when the coupling of light from the LED light source 340 into the plate 320 is optimized in the best way possible, i.e., there is no air gap between the LED light source 340 and the plate 320 and the coupling optics of the LED light source 340 is made of the same material as the plate 320. For the reflective type substrate-guided holographic diffuser, the light transmission value can be made even higher when, in addition to the optimized LED light source coupling, an anti-reflective coating is deposited on the substrate-guided holographic diffuser side opposite to the holographic surface H (FIG. 7).

As a backlight unit for an LCD display application, the substrate-guided holographic diffuser-based illumination light patch is more compact than current solutions because it eliminates the need to place LEDs at some distance from the diffuser as in current state-of-the art. In addition, substrate-guided holographic diffuser replaces a 6-7 element stack of light-shaping elements needed to generate homogeneous bright illumination with a single substrate-guided holographic diffuser component.

It should be further understood that substrate-guided holographic diffuser for LCD backlighting provides substantial increase both in light throughput efficiency and substantial power savings over the current-state-of-the-art. Existing LCD backlights have at least 7 components (FIG. 3): LEDs, light guide, two prismatic films, reflector, and two diffusers. At each surface-air interface there is a loss of ~4% of light. The reflector is usually laminated on the bottom of the light guide, so light loss on its interface with the light-guide plate might not be counted. Thus, there are nine surface-air interfaces, and, therefore, ~36% total light loss. Because substrate-guided holographic diffuser is replacing all these components, it reduces this light loss to ~4%. Therefore, substrate-guided holographic diffuser provides up to ~30% in light throughput efficiency (and in electric power savings) improvement compared to current state-of-the-art LCD backlight solutions.

It should be further understood also that substrate-guided holographic diffuser for LED lighting offers substantial advantages over existing technologies as described below. The requirement for reduced energy usage in architectural, street, etc. lighting applications is directly related to the efficiency of light-shaping elements: they should deliver a pre-designed light pattern with minimal light losses. At the same time, they need to provide flexibility and compactness in design. Substrate-guided holographic diffuser provides a solution for both of these requirements.

Figure 11:
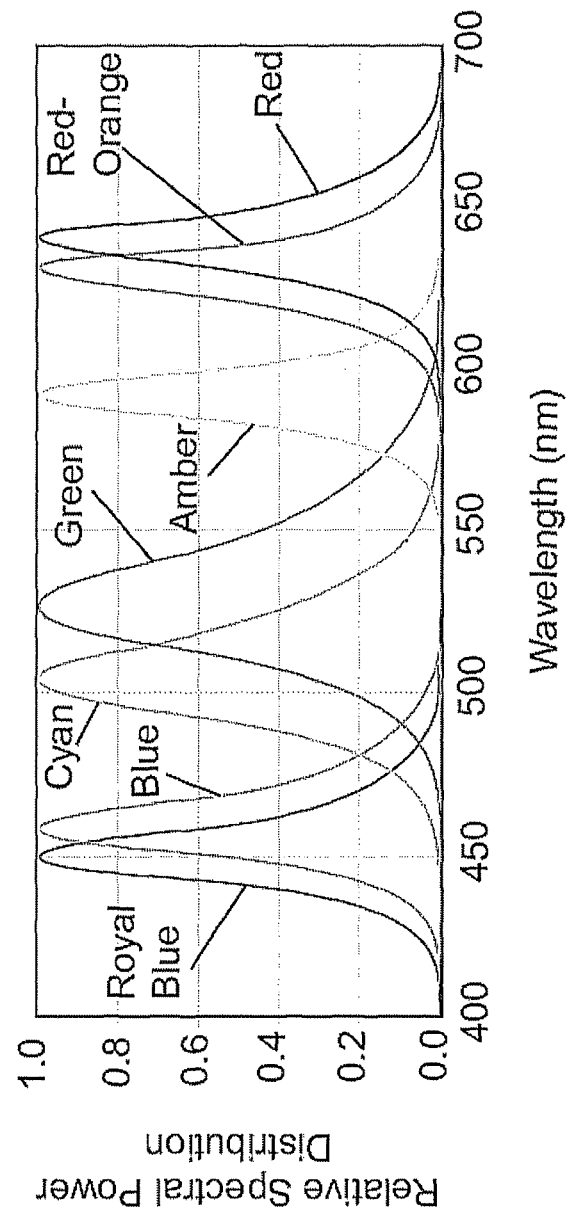
FIG. 11 is spectra of Luxeon color LEDs: Royal Blue—447 nm, Green—530 nm, Red—627 nm
Figure 12:
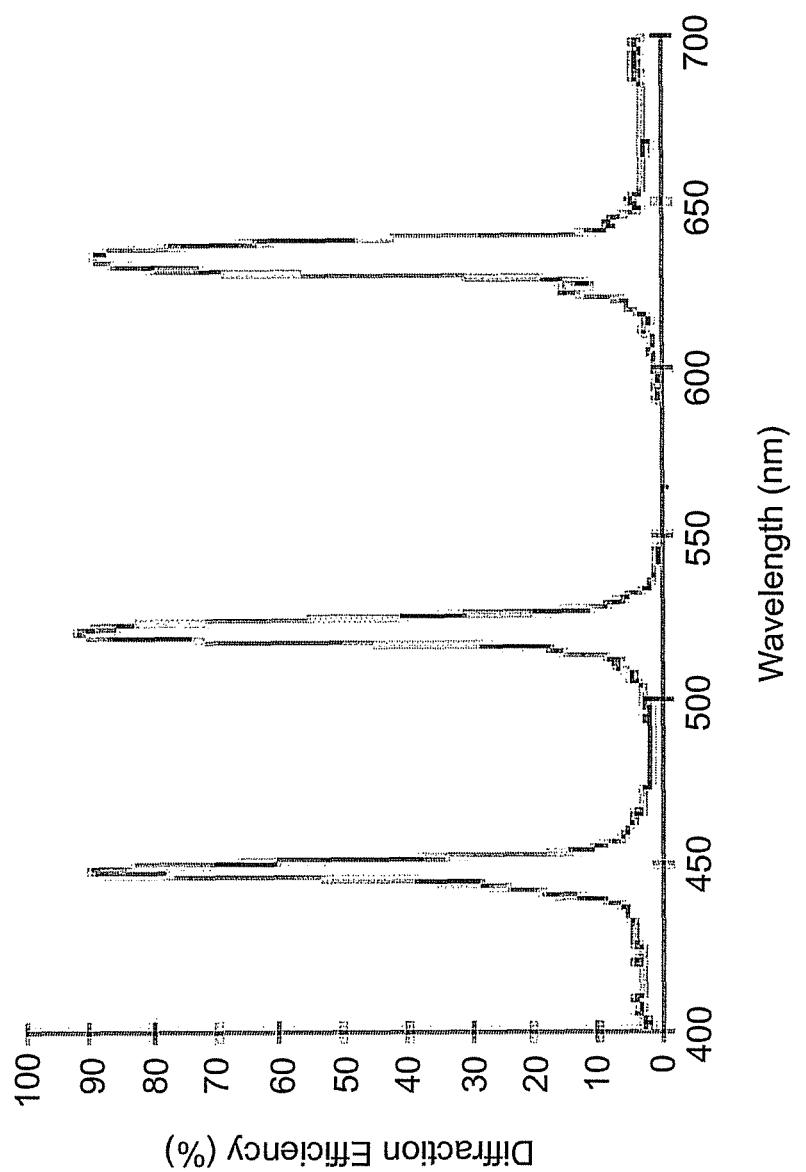
FIG. 12 is the wavelength selectivity of 20 µm thick DuPont photopolymer in RGB bands

Another advantage of the substrate-guided holographic diffuser is provided by coupling practically all of the light from the LEDs to the diffuser. Such narrow-band LEDs are available from a number of manufacturers. FIG. 11 shows spectra of color Luxeon LEDs available from Lumileds [www.philipslumileds.com, Luxeon Rebel Direct Color Portfolio, 2010]. These LEDs have ~20 nm FWHM for Red (627 nm center wavelength), ~24 nm FWHM for Royal Blue (447 nm center wavelength), and ~30 nm FWHM for Green (center wavelength 530 nm). For comparison, FIG. 12 shows the wavelength selectivity of color photopolymer manufactured by DuPont [Ref. 26] that is used as a recording medium, each bandwidth has ~20 nm FWHM.

Yet another advantage of substrate-guided holographic diffuser compared to a regular diffuser is its ability to concentrate the diffused light if it is illuminated with a phase-conjugated beam.

The described embodiments of the substrate-guided holographic diffuser refer to methods and techniques to make a 'master' diffuser. The 'master' diffuser needs to be replicated. This can be done, e.g., using "contact copying" of volume ('thick') holographic optical elements by means of a roll-to-roll web process. A flexible film such as static cling vinyl as an index matching material can be used. The advantage of this material is that it will suppress the recording of spurious holograms and will allow dry contact copying.

Another important factor in copying is that the photopolymer material requires an absorption liner such as black polyester or orange dyed polyester (available, e.g., from CPFilms) as a top liner to avoid recording spurious holograms.

Another aspect of the present invention relates to copying the 'master' substrate-guided holographic diffuser in the case when the holographically-formed surface 350 is of the surface relief ('thin') rather than of a volumetric type. In this case, the copying is brought about through a web-based molding process.

With regard to the foregoing, it will be observed that numerous modifications and variations can be effectuated without departing from the true spirit and scope of the novel concepts of the present inventions. It is to be understood that no limitation with respect to the specific embodiment illustrated should be inferred. The disclosure is intended to cover by the appended claims all such modifications as fall within the scope of the claims. All of the references that follow are incorporated by reference as if set forth fully herein.

REFERENCES

1. S. Kobayashi, S. Mikoshiba, S. Lim, Eds. LCD Backlights, John Wiley & Sons, Ltd. (2009)
2. M. Tijian, "LED Solutions for LCD Backlighting in Various Sizes," ADEAC 04, pp. 149-150, 2004
3. M. Parikka et al, "Deterministic Diffractive Diffusers for Displays", *Applied Optics*, Vol. 40(14), pp. 2239-2246 (2001).
4. B. Denis, "Optimizing Displays for Automotive Environment," *Vehicle Displays SID Proceedings,* 2002.
5. M. Anandan, "LED Backlight: Enhancement of Picture Quality on LCD Screen," *Proc. of ASID '06*, p. 130, 2006.
6. J. M. Tedesco, "Edge-Lit Holographic Diffusers for Flat-Panel Displays", U.S. Pat. No. 5,418,631 (1995).

7. Y. Inaba, Y. Nagai, I. Fujieda, "Edge-lit Backlight Utilizing a Laser Diode and an Optical Fiber", *Proceeding of the International Display Workshops*, pp. 705-708 (2007).
8. S. M. Lee et al., "New Concept for Improvement of White Color Balance in Hologram Backlight Units", *SID Digest*, pp. 1361-1363 (2003)
9. A. Nagasawa et al., "Ultra Slim and Bendable Backlight System with a Unified Component for Liquid Crystal Display Applications", *Optical Review*, Vol. 15(1), pp. 38-43 (2008).
10. Ya. Sugimoto et. al., "Back Light Device and Liquid Crystal Display Device", US Patent Application Publication US 2007/0139956 A1 (2007).
11. A. K. Aristov et. al., "Holographic Diffraction Grating for Side Lighting of Liquid-Crystal Displays", *J. Opt. Technology*, Vol. 70(7), pp. 480-484 (2003).
12. H. Jagdt et al., "Micro-Structured Polymeric Linearly Polarized Light Emitting Lightguide for LCD Illumination", *SID Digest*, pp. 1236-1239 (2002).
13. S.-I. Ochiai, "Light Guide Plates and Light Guide Plate Assembly Utilizing Diffraction Grating", U.S. Pat. No. 5,703,667 (1997).
14. D. J. Schertler and N. George, "Uniform Scattering Patterns from Grating-Diffuser Cascades for Display Applications", *Appl. Optics*, Vol. 38, pp. 291-303 (1999).
15. F. Dimov et. al., "Holographic Substrate-Guided Wave-Based See-Through Display", US Patent Application 2010/0157400 A1 (2010).
16. J. Upatnieks, "Edge-Illuminated Holograms", *Applied Optics*, Vol. 31(8), pp. 1048-1052(1992).
17. P. Wisely, "Head Up and Head Mounted Display Improvements Through Advanced Techniques in the Manipulation of Light", *Proceedings of SPIE*, Vol. 7327 (2009)
18. H. Mukawa et al., "Optical Device and Virtual Image Display Device", U.S. Pat. No. 7,418,170 (2008).
19. C. Chen et. al., "Use of Molecular Dynamics Method for Dot Pattern Design of a Thin Light Guide in an LED Backlight", *Optical Engineering*, Vol. 48(10), p. 104002 (2009).
20. M. Wright, 'Lighting Controls', *LEDs Magazine*, p. 61, July/August 2010
21. 'LightFair International Highlights', LD+A, The Magazine of the Illuminating Engineering Society of North America, p. 58, April 2010.
22. Luminit, Diffuser Product Line Page, www.luminitco.com
23. www.cargille.com/immerliq.shtml, Cargille Labs website, last modified Jan. 14, 2010
24. R. J Collier, C. B. Burckhardt, L. H. Lin, *Optical Holography*, New York, Academic Press (1971).
25. T. Jannson et al. "Performance Metrics for Integrated Lighting Systems," *Proc SPIE*, Vol. 6225, 2006.
26. B. Monroe, 'Improved Photopolymers for Holographic Recording, II, Mechanism of Hologram Formation', Journal of Imaging Science, Vol. 35, pp. 25-29, 1991.
27. G. Wyszecki, W. S. Stiles, Color Science, 2-nd Ed., John Wiley and Sons, 2000.

The invention claimed is:

1. A substrate-guided holographic diffuser comprising:
a light-guide plate: and
a single holographic diffuser comprising a volumetric (thick) type hologram attached to a surface of the light-guided plate wherein the hologram comprises an adjusted diffraction efficiency over the surface of the light-guide plate; and
wherein the adjusted diffraction efficiency comprises a centralized, diffraction efficiency gradient having a maximal efficiency in a central part of the hologram and decreasing smoothly to an edge of the hologram applied to the surface of the light-guide plate when multiple light sources are placed around the light-guide plate.

2. The substrate-guided holographic diffuser of claim 1 where the light is not coherent.

3. The substrate-guided holographic diffuser of claim 1 where the light source comprises at least one LED or laser diode.

4. The substrate-guided holographic diffuser of claim 1 further comprising multiple LED modules or laser diodes.

5. The substrate-guided holographic diffuser of claim 1 where said hologram is holographically-recorded using multiple wavelengths of laser light thus providing multi-color backlighting.

6. The substrate-guided holographic diffuser of claim 1 further comprising a single-color or multiple-color laser source coupled to the substrate-guided holographic diffuser through a fiber optic means.

7. The substrate-guided holographic diffuser of claim 1 wherein the substrate-guided holographic diffuser is flexible or bendable.

* * * * *